(12) United States Patent
Yamana

(10) Patent No.: US 9,371,791 B2
(45) Date of Patent: Jun. 21, 2016

(54) COMBUSTION STATE CONTROL DEVICE FOR VEHICULAR INTERNAL COMBUSTION ENGINE

(71) Applicant: SUZUKI MOTOR CORPORATION, Shizuoka (JP)

(72) Inventor: Shunsuke Yamana, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 421 days.

(21) Appl. No.: 13/854,191

(22) Filed: Apr. 1, 2013

(65) Prior Publication Data

US 2013/0282261 A1 Oct. 24, 2013

(30) Foreign Application Priority Data

Apr. 24, 2012 (JP) ................................. 2012-098500

(51) Int. Cl.
| | |
|---|---|
| *F02D 41/22* | (2006.01) |
| *F02D 41/00* | (2006.01) |
| *F02D 41/14* | (2006.01) |
| *F02D 41/02* | (2006.01) |
| *F02D 35/02* | (2006.01) |

(52) U.S. Cl.
CPC .............. *F02D 41/22* (2013.01); *F02D 35/027* (2013.01); *F02D 41/0087* (2013.01); *F02D 41/1498* (2013.01); *Y02T 10/40* (2013.01)

(58) Field of Classification Search
None
See application file for complete search history.

(56) References Cited

U.S. PATENT DOCUMENTS

| | | | | | |
|---|---|---|---|---|---|
| 4,221,193 | A | * | 9/1980 | Ezoe et al. ..................... | 123/483 |
| 5,964,811 | A | * | 10/1999 | Ishii ...................... | F02D 41/266 |
| | | | | | 123/479 |
| 6,102,012 | A | * | 8/2000 | Iiboshi et al. ................. | 123/556 |
| 6,978,204 | B2 | * | 12/2005 | Surnilla et al. ................. | 701/103 |
| 2002/0134357 | A1 | * | 9/2002 | White ................ | F02D 41/0087 |
| | | | | | 123/481 |
| 2007/0204830 | A1 | * | 9/2007 | Andri .......................... | 123/198 F |

(Continued)

FOREIGN PATENT DOCUMENTS

| | | |
|---|---|---|
| CN | 1683769 A | 10/2005 |
| CN | 101395362 A | 3/2009 |

(Continued)

OTHER PUBLICATIONS

The First Office Action mailed May 5, 2015 in corresponding Chinese Patent Application No. 201310088347.1 (with an English translation) (15 pages).

*Primary Examiner* — John Kwon
*Assistant Examiner* — Brian P Monahon
(74) *Attorney, Agent, or Firm* — Rothwell, Figg, Ernst & Manbeck, P.C.

(57) ABSTRACT

A combustion state control device for an internal combustion engine includes an abnormal combustion detecting unit for detecting abnormal combustion of the internal combustion engine, a fuel supply cut-off unit for cutting off a fuel supply to a cylinder where the abnormal combustion is detected during a cycle from an intake stroke of the cylinder to a next intake stroke thereof, when the abnormal combustion detecting unit detects the abnormal combustion of a cylinder, a vehicle vibration detecting unit for detecting vibration of a vehicle, and a fuel supply cut-off ending unit for ending cutting off of the fuel supply when the vehicle vibration detecting unit detects the vibration of the vehicle while the fuel supply is being cut off.

3 Claims, 6 Drawing Sheets

(56) References Cited

U.S. PATENT DOCUMENTS

| | | | | |
|---|---|---|---|---|
| 2009/0037084 A1* | 2/2009 | Suzuki | | F02D 17/02 |
| | | | | 701/112 |
| 2009/0088956 A1* | 4/2009 | Lin | | B60Q 9/00 |
| | | | | 701/111 |
| 2009/0240423 A1* | 9/2009 | Fujino | | F02D 37/02 |
| | | | | 701/111 |
| 2010/0107995 A1* | 5/2010 | Kamiyama | | F01P 7/14 |
| | | | | 123/41.02 |
| 2011/0029218 A1* | 2/2011 | Nakagawa et al. | | 701/103 |
| 2011/0214649 A1* | 9/2011 | Imamura | | F02B 19/108 |
| | | | | 123/673 |
| 2012/0029789 A1 | 2/2012 | Mehta et al. | | |

FOREIGN PATENT DOCUMENTS

| | | |
|---|---|---|
| JP | 62-171642 U | 10/1987 |
| JP | 4-17142 U | 2/1992 |
| JP | 11-36906 A | 2/1999 |

* cited by examiner

COMBUSTION STATE CONTROL DEVICE FOR VEHICULAR INTERNAL COMBUSTION ENGINE

CROSS-REFERENCE

This document claims priority to Japanese Application Number 2012-098500, filed Apr. 24, 2012, the entire content of which is hereby incorporated by reference.

TECHNICAL FIELD

The present invention relates to a technology of controlling a combustion state of a vehicular internal combustion engine.

BACKGROUND ART

An example solution to improve the fuel economy of an internal combustion engine is a technology of setting a compression ratio to be high.

When the compression ratio is set to be high, however, there is a disadvantage that is likely to cause abnormal combustion, such as a knocking, or a pre-ignition before ignition.

In order to address such a disadvantage, a technology is known which delays the closing timing of an intake valve using a variable intake-valve mechanism upon detection of a knocking or detection of an ion current flowing through via a spark plug, i.e., retarding a so-called intake Variable Valve Timing (VVT), so that abnormal combustion can be avoided (see, for example, Patent Document 1).

According to this technology, however, in the case of an internal combustion engine especially under a severe running condition (e.g., a compression ratio is especially high, the interference in an exhaust process is large, or the like) and in an environment in which a water temperature and an intake temperature are both high (i.e., a heat-damage environment), it is difficult to suppress abnormal combustion only through the intake VVT retardation.

To address such a difficulty, there is a technology for cutting off a fuel supply to a cylinder at which the abnormal combustion has occurred to lower the temperature inside such a cylinder or to scavenge the interior thereof, thereby suppressing the abnormal combustion.

For example, in a technology disclosed in Patent Document 2, the fuel supply is cut off when any knocking is still detected even if the ignition timing is retarded to the retarded limit timing, so as to cool the interior of a cylinder.

Moreover, in a technology disclosed in Patent Document 3, the pressure inside a cylinder during a compression cycle is detected for cutting off the fuel supply to a cylinder that has caused a pre-ignition.

PRIOR ART DOCUMENTS

Patent Documents

Patent Document 1: JP H11-36906 A
Patent Document 2: JP S62-171642 A
Patent Document 3: JP H04-17142 A

SUMMARY OF THE INVENTION

Problem to be Solved

When the fuel supply to a cylinder at which the abnormal combustion has occurred is cut off (Fuel Cut, hereinafter, also referred to as F/C), however, the cylinder where the fuel supply is cut off may increase an engine vibration in comparison with an actual engine running condition having no abnormal combustion occurred, since such a cylinder has no combustion behavior.

The engine vibration generated in this manner may give a driver or a passenger an unpleasant feel.

It is an object of the present invention to suppress abnormal combustion, and to suppress an engine vibration caused by cutting off the fuel supply to a cylinder that has been performed to suppress the abnormal combustion, so as to improve the merchantability.

Solution to the Problem

To accomplish the above object, according to an aspect of the present invention, there is provided a combustion state control device for a vehicular internal combustion engine that cuts off a fuel supply to a cylinder of the vehicular internal combustion engine, when detecting abnormal combustion of the vehicular internal combustion engine, the combustion state control device comprising: an abnormal combustion detecting unit configured to detect abnormal combustion inside the vehicular internal combustion engine; immediately after the abnormal combustion detecting unit detecting abnormal combustion inside a cylinder, a fuel supply cut-off unit configured to cut off fuel supply to the cylinder during a cycle from an intake stroke of the cylinder to a next intake stroke of the cylinder; a vibration detecting unit configured to detect vibration of a vehicle; and a fuel supply cut-off ending unit configured to end cutting off fuel supply to the cylinder when the vibration detecting unit detects that the vehicle acceleration is equal to or larger than a vibration determination vehicle acceleration or the fluctuation in engine speed is equal to or larger than a vibration determination fluctuation value during cutting off fuel supply to the cylinder.

In the above-explained aspect of the present invention, preferably, when the abnormal combustion detecting unit detects abnormal combustion inside a plurality of cylinders, the fuel supply cut-off unit cuts off fuel supply to each of the plurality of cylinders during one cycle, with one cycle being a unit of time for cutting off fuel supply to one cylinder.

In the above-explained aspect of the present invention, preferably, the combustion state control device for the vehicular internal combustion engine further comprises a fuel supply amount increasing unit configured to increase the amount of fuel supplied to at least one of a plurality of cylinders when the abnormal combustion detecting unit detects abnormal combustion inside the plurality of cylinders than when the abnormal combustion detecting unit does not detect abnormal combustion inside the plurality of cylinders.

In the above-explained aspect of the present invention, preferably, the abnormal combustion detecting unit is further configured to detect a degree of abnormal combustion inside each of the plurality of cylinders; the fuel supply amount increasing unit is further configured to select that one of the plurality of cylinders which experiences the highest degree of abnormal combustion among the plurality of cylinders and increase the amount of fuel supplied to the selected one cylinder than when the abnormal combustion detecting unit does not detect abnormal combustion inside the selected one cylinder; and the fuel supply cut-off unit is further configured to cut off fuel supply to at least one of the remainder of the plurality of cylinders other than the selected one cylinder.

In the above-explained aspect of the present invention, preferably, the combustion state control device for a vehicular internal combustion engine further comprises a fuel supply amount adjusting unit configured to adjust fuel supply to the remainder of a plurality of cylinders with the cylinder, to which fuel supply is being cut off, taken away to cause exhaust gas from the plurality of cylinders to approach the theoretical or stoichiometric air-fuel ratio.

In the above-explained aspect of the present invention, preferably, the combustion state control device for the vehicular internal combustion engine further comprises a water temperature detecting unit configured to detect a water temperature of the vehicular internal combustion engine, and the higher the water temperature detected by the water temperature detecting unit, the longer a period of time, during which the fuel supply cut-off unit cuts off fuel supply to the cylinder, becomes.

In the above-explained aspect of the present invention, preferably, the combustion state control device for the vehicular internal combustion engine further comprises an intake temperature detecting unit configured to detect an intake temperature to the vehicular internal combustion engine, and the higher the intake temperature detected by the intake temperature detecting unit, the longer a period of time, during which the fuel supply cut-off unit cuts off fuel supply to the cylinder, becomes.

In the above-explained aspect of the present invention, preferably, the abnormal combustion detecting unit detects a degree of abnormal combustion inside the cylinder, and the higher the degree of abnormal combustion detected by the abnormal combustion detecting unit, the longer a period of time, during which the fuel supply cut-off unit cuts off fuel supply to the cylinder, becomes.

In the above-explained aspect of the present invention, preferably, the combustion state control device for the vehicular internal combustion engine further comprises a running acceleration detecting unit configured to detect acceleration of the vehicle while the vehicle is running, and when the acceleration detected by the running acceleration detecting unit while the vehicle is running is equal to or less than a preset threshold, the fuel supply cut-off unit does not cut off fuel supply to the cylinder.

Advantageous Effects of the Invention

According to several aspects of the present invention, the fuel supply to a cylinder where abnormal combustion is detected is cut off, thereby suppressing the abnormal combustion from continuing.

In addition, the fuel supply to the cylinder where the abnormal combustion is detected is cut off, thereby cooling down the cylinder at which the abnormal combustion has occurred, and suppressing the abnormal combustion from occurring again.

Furthermore, cutting off the fuel supply is ended when a vibration detecting unit detects vibration of a vehicle while the fuel supply is being cut off, thereby suppressing an increase in the vibration of an internal combustion engine caused by cutting off the fuel supply. Hence, it becomes possible to prevent unpleasant vibration from transmitting to a driver or a passenger during abnormal combustion suppressing control.

The fuel supply to the respective cylinders is not cut off simultaneously, and thus the increase in the vibration of the internal combustion engine caused by cutting off the fuel supply can be suppressed.

The vaporization latent heat of the fuel in the cylinder can be increased. Accordingly, the interior of the cylinder can be cooled down, and the continuation of the abnormal combustion can be suppressed.

Based on the level of the abnormal combustion, the interior of the cylinder can be cooled down by increasing the fuel supply amount or by cutting off the fuel supply to the cylinder.

A catalyst disposed in the exhaust passage of the internal combustion engine can efficiently purify the exhaust gas.

The vaporization latent heat of the fuel in the cylinder can be increased by increasing the fuel supply amount to the cylinder other than the cylinder where the fuel supply is cut off. This allows cooling down of the interior of the cylinder other than the cylinder where the fuel supply is cut off, so that the occurrence of the abnormal combustion can be reduced.

The time for continuously cutting off the fuel supply is made longer, as the water temperature is higher. It becomes therefore possible to suppress the abnormal combustion from occurring again after the abnormal combustion occurred.

The time for continuously cutting off the fuel supply is made longer, as the intake temperature is higher. It becomes therefore possible to suppress the abnormal combustion from occurring again after the abnormal combustion occurred.

The time for continuously cutting off the fuel supply is made longer, as the level of the abnormal combustion is higher. It becomes therefore possible to suppress the abnormal combustion from occurring again after the abnormal combustion occurred.

Since there are few fluctuations in the vibration from the internal combustion engine, under a vehicle running condition in which the driver or the passenger is likely to sense a change in vibration of the internal combustion engine, it becomes possible to prevent a driver or a passenger from receiving an unpleasant feel caused by the vibration of the internal combustion engine due to cutting off of the fuel supply

DESCRIPTION OF EMBODIMENTS

An explanation will now be given of embodiments of the present invention with reference to the accompanying drawings.

(First Embodiment)

A first embodiment will be explained at first.

The first embodiment relates to a vehicle on which a combustion state control device of an internal combustion engine is mounted.

(Configuration)

Figure 1:
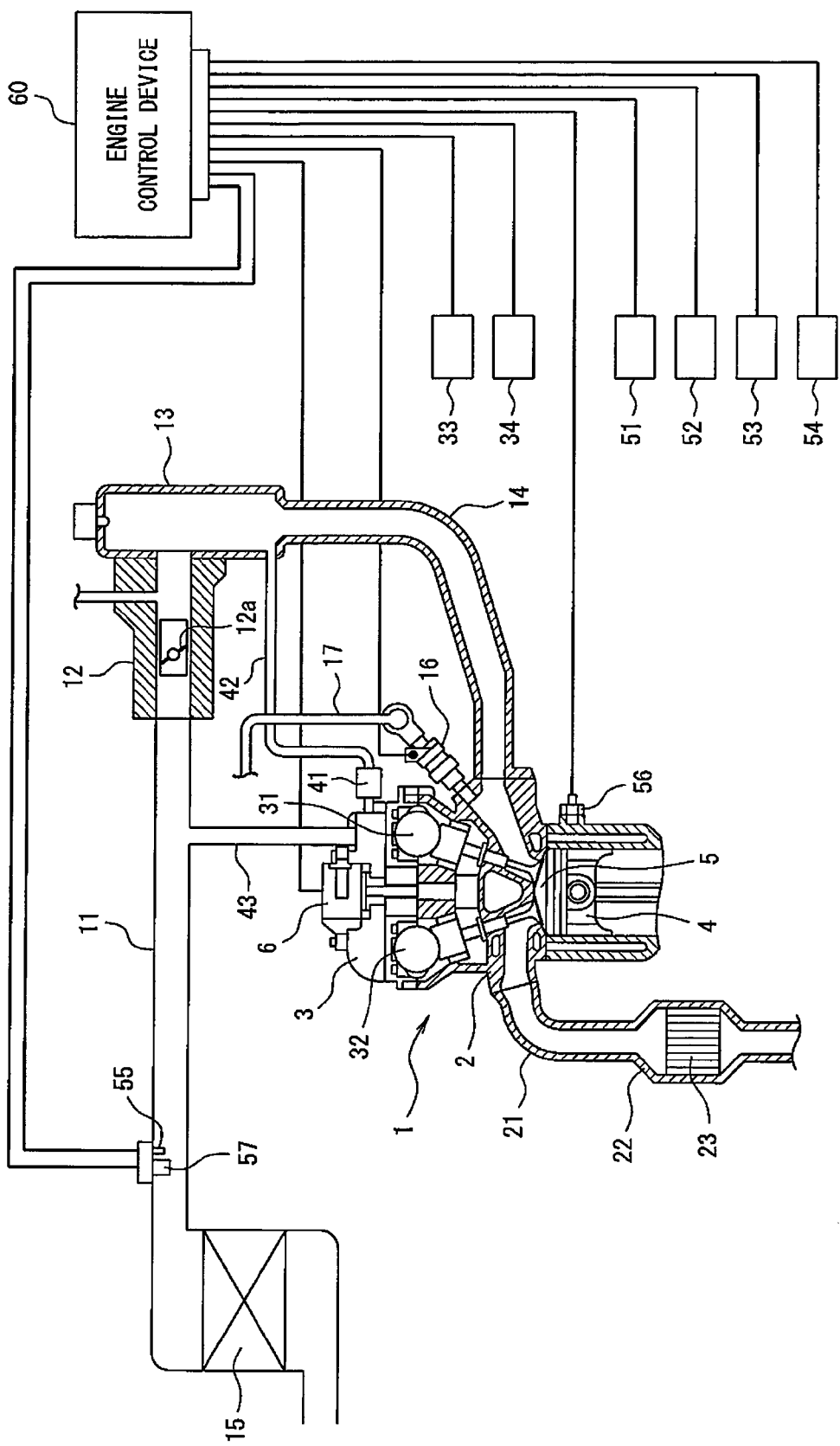
FIG. 1 is a diagram illustrating an example configuration of a vehicle according to an embodiment of the present invention.

FIG. 1 is a diagram illustrating an example configuration of a vehicle according to the present embodiment.

In FIG. 1, an internal combustion engine 1 of the vehicle includes a cylinder head 2, a cylinder head cover 3, pistons 4, combustion chambers 5, and an ignition coil 6. This internal combustion engine 1 is a four-stroke internal combustion engine. In the internal combustion engine 1, a combustion state, etc., are controlled by an engine control device (e.g., an Engine Control Module (ECM)) 60.

In the intake system of this internal combustion engine 1, an intake piping 11 is connected to an intake manifold 14 in communication with the combustion chambers 5, via an electronically controlled throttle body 12 and a surge tank 13. Moreover, an air cleaner 15 is disposed in the intake piping 11 at the upstream side thereof. A throttle valve 12a is provided in the electronically controlled throttle body 12. In the electronically controlled throttle body 12, the opening degree, etc., of the throttle valve 12a are controlled by the engine control device 60.

In addition, the intake manifold 14 is provided with fuel injection nozzles 16 directed to respective combustion chambers 5. The fuel injection nozzles 16 are connected to a fuel supply piping 17 in communication with a fuel tank, not illustrated. A fuel injection quantity and a fuel injection timing, etc., of the fuel injection nozzles 16 are controlled by the engine control device 60.

Further, in the exhaust system of the internal combustion engine 1, an exhaust piping, not illustrated, is connected via a catalyst converter 22 to an exhaust manifold 21 in communication with the combustion chambers 5. A catalyst 23 is provided in the catalyst converter 22.

Additionally, the cylinder head 2 is attached with an intake Variable Valve Timing (VVT) actuator 31 of the VVT device at an end of an intake cam shaft, not illustrated. Moreover, the cylinder head 2 is attached with an exhaust VVT actuator 32 at an end of an exhaust cam shaft, not illustrated. In accordance with such a structure, the internal combustion engine 1 is provided with an intake VVT oil control valve 33 that actuates the intake VVT actuator 31, and an exhaust VVT oil control valve 34 that actuates the exhaust VVT actuator 32. The engine control device 60 controls the driving of individual VVT actuators 31 and 32 through each of the VVT oil control valves 33 and 34.

Also, the ignition coil 6 is electrically connected to spark plugs, not illustrated, and the engine control device 60 controls a voltage to ignite the spark plugs.

Furthermore, a first blow-by gas piping 42 in communication with the interior of the surge tank 13 via a Positive Crankcase Ventilation (PCV) valve 41 is connected to the cylinder head cover 3. Additionally, a second blow-by gas piping 43 in communication with the intake piping 11 at the upstream side of the electronically controlled throttle body 12 is connected to the cylinder head cover 3. The PCV valve 41 returns the blow-by gas produced in the interior of the crankcase to the intake side.

The vehicle of the present embodiment includes a vehicle speed sensor 51, a vehicle acceleration sensor (so-called vehicle G sensor) 52, a water temperature sensor 53, an engine speed sensor 54, an intake temperature sensor 55, and knocking sensors (or knock sensors) 56.

The vehicle speed sensor 51 detects a vehicle speed of the subject vehicle. The vehicle speed sensor 51 outputs a detected value to the engine control device 60.

The vehicle acceleration sensor 52 is attached to the floor or the like of a vehicle body, and detects a vibration of the vehicle and a road gradient (i.e., an inclination of the vehicle). According to the present embodiment, the vehicle acceleration sensor 52 detects a vehicle acceleration generated in the interior of the vehicle. Then, the vehicle acceleration sensor 52 outputs a detected value to the engine control device 60.

The engine speed sensor 54 is attached to the internal combustion engine 1 and detects the engine speed. Then, the engine speed sensor 54 outputs a detected value to the engine control device 60.

The water temperature sensor 53 detects a temperature of the coolant of the internal combustion engine 1. The water temperature sensor 53 outputs a detected value to the engine control device 60.

The intake temperature sensor 55 is attached to the intake piping 11, and detects an intake temperature. The intake temperature sensor 55 outputs a detected value to the engine control device 60. According to the present embodiment, as is illustrated in FIG. 1, the intake temperature sensor 55 is attached adjacently to an air flow sensor 57 that detects the volume of inflow air to the intake piping 11.

The knocking sensor 56 detects a vibration of an engine block generated by a knocking. The knocking sensor 56 is attached to the engine block of the internal combustion engine 1 to correspond to each cylinder. Then, the knocking sensor 56 outputs a detected value to the engine control device 60.

The engine control device 60 is constituted by an Electronic Control Unit (ECU) having, for example, a microcomputer and peripheral circuits thereof. Hence, the engine control device 60 includes a CPU, a ROM, and a RAM, etc. The ROM stores one or more programs that realize various kinds of processes. The CPU executes the various kinds of processes in accordance with the at least one or more programs stored in the ROM.

The engine control device 60 controls the internal combustion engine 1 in accordance with detected values, etc., detected by various sensors like the vehicle speed sensor 51.

According to the present embodiment, the engine control device 60 performs a control process that suppresses abnormal combustion based on the detected values of various sensors.

Figure 2:
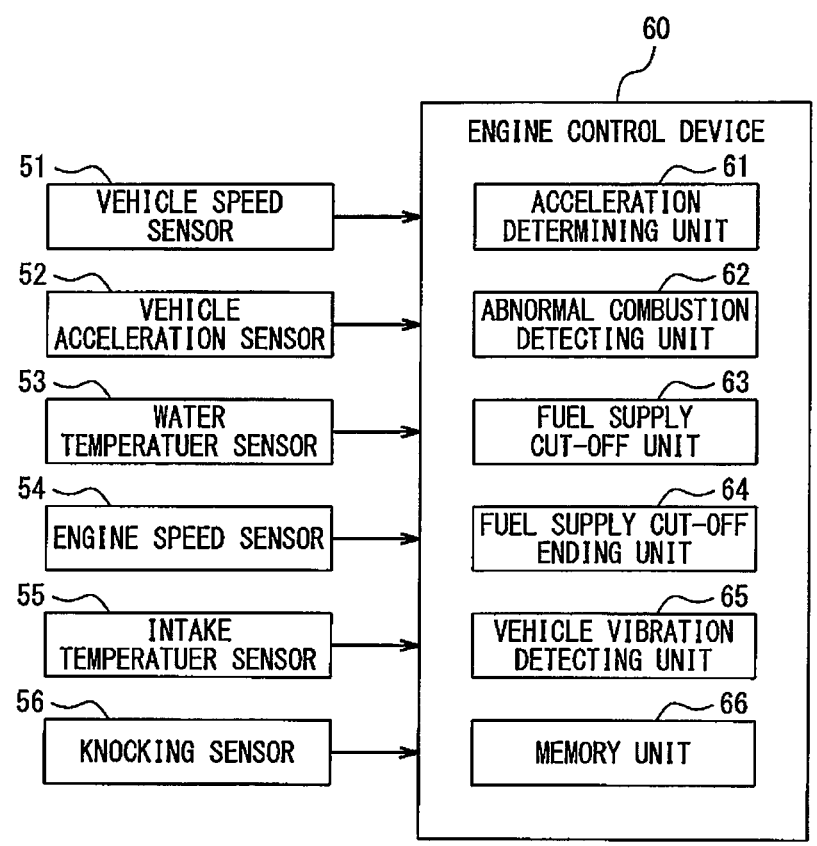
FIG. 2 is a block diagram illustrating an example configuration of an engine control device.

FIG. 2 is a block diagram illustrating an example configuration of the engine control device 60 that realizes such a control process.

As shown in FIG. 2, the engine control device 60 includes an acceleration determining unit 61, an abnormal combustion detecting unit 62, a fuel supply cut-off unit 63, a fuel supply cut-off ending unit 64, a vehicle vibration detecting unit 65, and a memory unit 66.

The acceleration determining unit 61 determines whether or not the subject vehicle is accelerating. More specifically, the acceleration determining unit 61 determines that the subject vehicle is accelerating when a rate of change (i.e., the acceleration) of the detected value (i.e., the vehicle speed) of the vehicle speed sensor 51 is equal to or higher than an acceleration determination threshold. For example, the acceleration determination threshold is preset based on experimentally, empirically, or theoretically to enable detection of the acceleration of the vehicle.

The abnormal combustion detecting unit 62 detects abnormal combustion of the internal combustion engine 1 (specifically, each cylinder). More specifically, the abnormal combustion detecting unit 62 detects the abnormal combustion for each cylinder based on the detected value of the knocking sensor 56 attached to each cylinder. For example, when the detected value of the knocking sensor 56 is equal to or higher than an abnormal combustion determination threshold, the abnormal combustion detecting unit 62 obtains a result that the abnormal combustion occurs at the cylinder to which the corresponding knocking sensor 56 is attached. For example, the abnormal combustion determination threshold is preset experimentally, empirically, or theoretically.

The operation of the abnormal combustion detecting unit 62 is not limited to the detection of abnormal combustion at the time of knocking, and the abnormal combustion detecting unit 62 may detect abnormal combustion like a pre-ignition.

The fuel supply cut-off unit 63 ends the fuel injection by the fuel injection nozzle 16, and cuts off (i.e., F/C) the fuel supply to the interior of the cylinder. More specifically, the fuel supply cut-off unit 63 controls the driving of the fuel injection nozzle 16 itself or controls the driving of a pump (e.g. a fuel pump) that supplies the fuel to the fuel injection nozzle 16 to end the fuel injection by the fuel injection nozzle 16, thereby cutting off the fuel supply to the cylinder.

The fuel supply cut-off ending unit 64 ends cutting off of such a fuel supply, by the fuel supply cut-off unit 63.

The vehicle vibration detecting unit 65 detects that the vehicle is vibrating. More specifically, when the vehicle acceleration that is a value detected by the vehicle acceleration sensor 52 is equal to or larger than a vibration determination vehicle acceleration (vehicle acceleration≥vibration determination vehicle acceleration), or when the fluctuation in the engine speed that is a value detected by the engine speed sensor 54 is equal to or larger than a vibration determination fluctuation value (fluctuation in engine speed≥vibration determination fluctuation value), the vehicle vibration detecting unit 65 obtains a result that the vehicle is vibrating. The vibration determination vehicle acceleration and the vibration determination variable value are preset experimentally, empirically, or theoretically.

The memory unit 66 stores information (e.g., the cylinder number) on the cylinder (hereinafter, referred to as abnormal combustion occurring cylinder) where the abnormal combustion occurs. The memory unit 66 is a memory that permits rewriting of data like the above-explained RAM.

Figure 3:
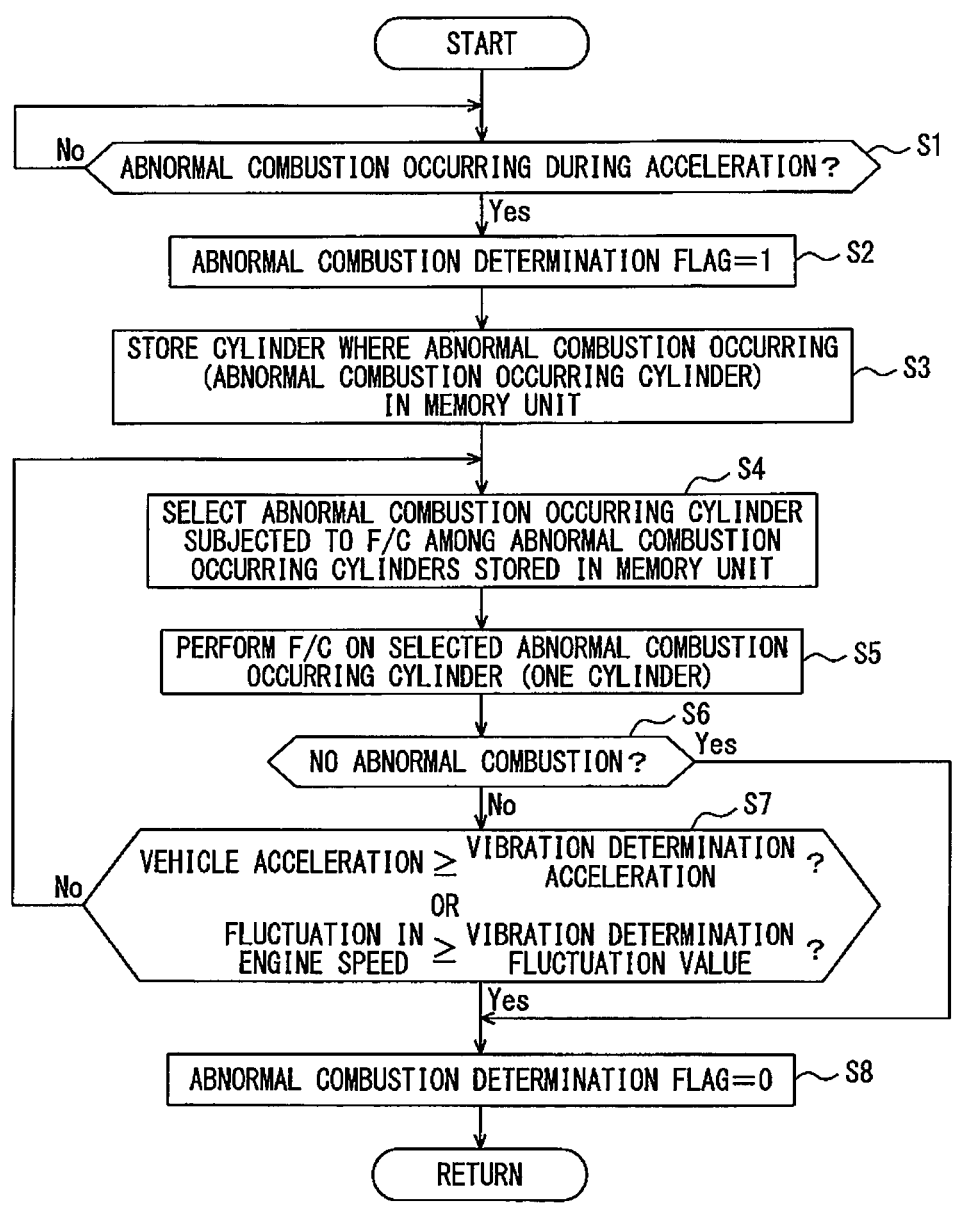
FIG. 3 is a flowchart illustrating an example of a process by the engine control device according to a first embodiment of the present invention.

FIG. 3 is a flowchart illustrating an example of an abnormal combustion suppressing process realized by the above-explained configuration illustrated in FIG. 2.

As shown in FIG. 3, firstly, the engine control device 60 determines in step S1 whether or not the abnormal combustion occurs at the subject vehicle during acceleration based on the determination result of the acceleration determining unit 61 and the detection result of the abnormal combustion detecting unit 62. When determining that the abnormal combustion occurs at the subject vehicle during the acceleration, the engine control device 60 progresses the process to step S2.

The engine control device 60 sets in step S2 an abnormal combustion determination flag indicating the presence or absence of the abnormal combustion suppressing control to be 1 (abnormal combustion determination flag=1). Next, the engine control device 60 starts the abnormal combustion suppressing control.

Subsequently, the engine control device 60 stores in step S3 the abnormal combustion occurring cylinder (e.g., the cylinder number) in the memory unit 66. At this time, when the abnormal combustion occurs at plural cylinders, the engine control device 60 stores the plural abnormal combustion occurring cylinders (e.g., the cylinder numbers) in the memory unit 66.

Next, the engine control device 60 reads in step S4 the abnormal combustion occurring cylinder (e.g., the cylinder number) subjected to the F/C from the memory unit 66. When there are plural abnormal combustion occurring cylinders, the engine control device 60 reads a single abnormal combustion occurring cylinder among the plural abnormal combustion occurring cylinders. In this case, for example, the engine control device 60 reads the plural abnormal combustion occurring cylinders (e.g., the cylinder numbers) stored in the memory unit 66 in the order that the abnormal combustion has occurred.

Subsequently, the engine control device 60 causes in step S5 the fuel supply cut-off unit 63 to perform the F/C during one cycle on the abnormal combustion occurring cylinder read in step S4. One cycle mentioned here is a cycle from an intake stroke to the next intake stroke, and is a cycle that allows the internal combustion engine 1 to rotate twice.

Next, the engine control device 60 determines in step S6 whether or not the abnormal combustion occurs at all the cylinders based on the detection result of the abnormal combustion detecting unit 62. When determining that no abnormal combustion is occurring, the engine control device 60 progresses the process to step S8. Conversely, when determining that abnormal combustion occurs, the engine control device 60 progresses the process to step S7.

The engine control device 60 determines in step S7 whether or not the vehicle acceleration is equal to or larger than the vibration determination vehicle acceleration or the fluctuation in the engine speed is equal to or larger than the vibration determination fluctuation value by use of the vehicle vibration detecting unit 65. When determining that the vehicle acceleration is equal to or larger than the vibration determination vehicle acceleration (vehicle acceleration≥vibration determination vehicle acceleration), or the fluctuation in the engine speed is equal to or larger than the vibration determination fluctuation value (fluctuation in engine speed≥vibration determination fluctuation value), the engine control device 60 progresses the process to step S8. Conversely, when the determination result is not so (vehicle acceleration<vibration determination vehicle acceleration and fluctuation in engine speed<vibration determination fluctuation value), the engine control device 60 restarts the process from step S4.

The engine control device 60 ends in step S8 the F/C by use of the fuel supply cut-off ending unit 64 to end the abnormal combustion suppressing control, and sets the abnormal combustion determination flag to be 0 (abnormal combustion determination flag=0). Next, the engine control device 60 ends the process illustrated in FIG. 3.

(Operations and Actions)

Next, an explanation will be given of successive operations by the engine control device 60 and actions thereof.

When the abnormal combustion occurs at the subject vehicle during acceleration, the engine control device 60 sets the abnormal combustion determination flag to be 1 to start the abnormal combustion suppressing control, and stores the abnormal combustion occurring cylinder (e.g., the cylinder number) in the memory unit 66 (steps S1 to S3).

Next, the engine control device 60 reads the abnormal combustion occurring cylinder (e.g., the cylinder number) subjected to the F/C from the memory unit 66, and performs the F/C on the read abnormal combustion occurring cylinder during one cycle (steps S4 and S5). That is, the engine control device 60 performs the F/C, thereby providing the scavenging and cooling cycles of one cycle to the abnormal combustion occurring cylinder.

When there are plural abnormal combustion occurring cylinders, the engine control device 60 reads the plural abnormal combustion occurring cylinders (e.g., the cylinder numbers) stored in the memory unit 66 in the order that abnormal combustions have occurred (in the detection order of the abnormal combustions), and successively performs the F/C for each cylinder per one cycle. That is, the engine control device 60 sets one cycle to be a unit of period for ending the fuel supply to a cylinder, and cuts off the fuel supply to each cylinder successively in each cycle.

Next, until the abnormal combustion is eliminated for all cylinders, or unless vehicle vibration to a certain level is detected, the engine control device 60 performs the F/C on the abnormal combustion occurring cylinder (steps S6 and S7). Conversely, when the abnormal combustion is eliminated for all cylinders or when the vehicle vibration to a certain level is detected, the engine control device 60 ends the abnormal combustion suppressing control to end the F/C (i.e., to start supplying the fuel), and sets the abnormal combustion determination flag to be 0 (steps S6 to S8).

(Advantageous Effects of First Embodiment)

According to the first embodiment, the engine control device 60 performs the F/C on the abnormal combustion occurring cylinder. Hence, according to the first embodiment, the engine control device 60 performs scavenging and cooling on the abnormal combustion occurring cylinder, thereby reducing the hot remaining gas that is a cause of the abnormal combustion, while at the same time, cooling down the interior of the cylinder.

Moreover, according to the first embodiment, when the vibration of the vehicle becomes large (specifically, when vehicle acceleration≥vibration determination vehicle acceleration or fluctuation in engine speed≥vibration determination fluctuation value), the engine control device 60 stops the F/C. Hence, according to the first embodiment, it becomes possible for the engine control device 60 to suppress an increase in the engine vibration due to the no-combustion state in the abnormal combustion occurring cylinder in comparison with an actual engine running condition in which no abnormal combustion occurs, and to prevent the vibration of the vehicle from giving a driver or a passenger an unpleasant feel.

(Second Embodiment)

Next, an explanation will be given of a second embodiment with reference to the accompanying drawings. The same or similar structural components to those of the first embodiment will be explained with the same reference numerals.

According to the second embodiment, a process of increasing the fuel supply amount for the cylinder where no F/C is performed is carried out.

Figure 4:
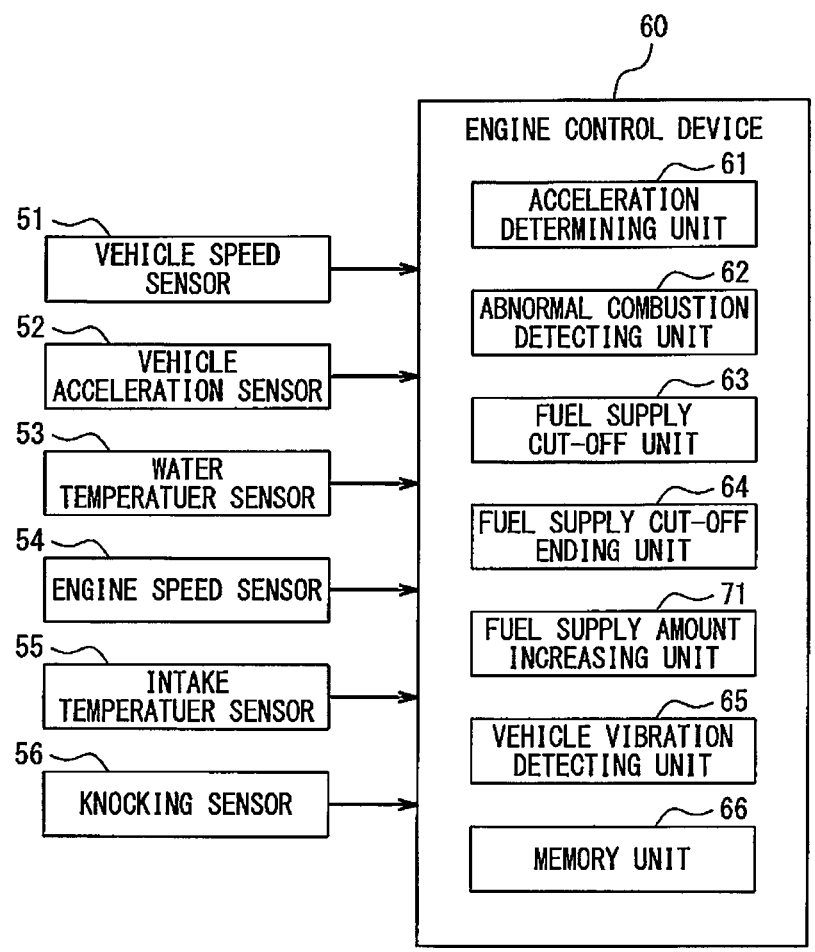
FIG. 4 is a block diagram illustrating an example configuration of an engine control device according to a second embodiment of the present invention.

FIG. 4 is a block diagram illustrating an example configuration of an engine control device 60 that realizes such a process according to the second embodiment.

As illustrated in FIG. 4, the engine control device 60 according to the second embodiment further includes a fuel supply amount increasing unit 71.

Figure 5:
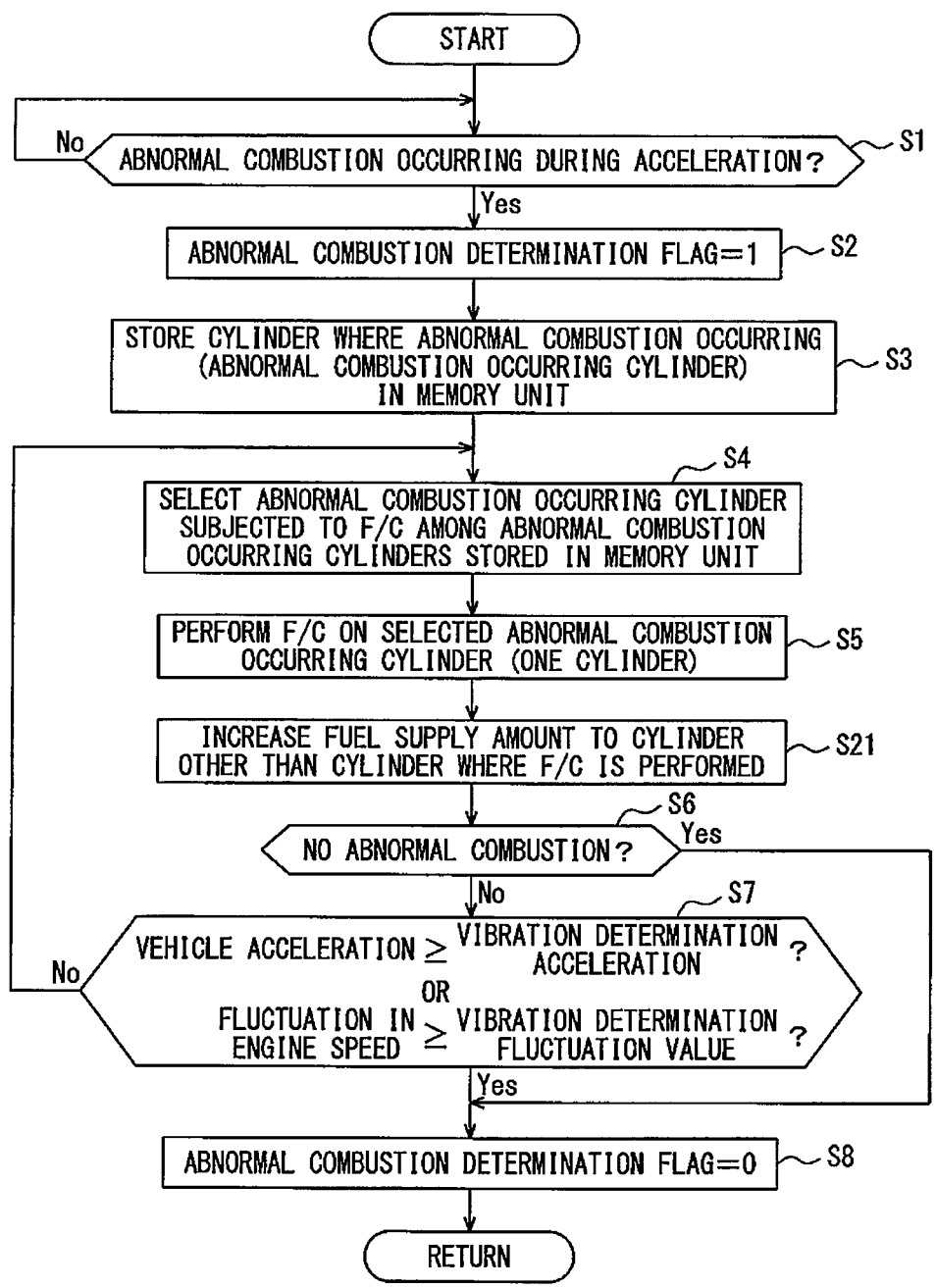
FIG. 5 is a flowchart illustrating an example of a process by the engine control device according to the second embodiment of the present invention.

FIG. 5 is a flowchart illustrating an example of an abnormal combustion suppressing process according to the second embodiment.

As shown in FIG. 5, according to this process, with respect to the process of the first embodiment illustrated in FIG. 3, a process in step S21 is added after the process in step S5.

The engine control device 60 causes in step S21 the fuel supply amount increasing unit 71 to increase the fuel supply amount to all cylinders other than the cylinder where the F/C is performed in step S5.

The cylinders other than the cylinder where the F/C is performed in step S5 include another abnormal combustion occurring cylinder and the cylinder having no abnormal combustion occurring.

Moreover, the fuel supply amount increasing unit 71 increases the injection quantity from the fuel injection nozzle 16, thereby increasing the fuel supply amount to the cylinder.

In addition, the fuel supply amount increasing unit 71 increases the fuel supply amount to each cylinder in such a way that the air-fuel ratio of the exhaust gas becomes a theoretical air-fuel ratio (also referred to as stoichiometry indicating a condition that satisfies air:fuel=14.7:1) at a location where the exhaust gases from respective cylinder merge, i.e., a location immediately before the catalyst 23. That is, for example, the fuel supply amount increasing unit 71 sorts the amount of fuel not supplied to the abnormal combustion occurring cylinder by the F/C into the fuel injection to the cylinder other than the abnormal combustion occurring cylinder. At this time, when there are plural cylinders other than the abnormal combustion occurring cylinder, the fuel supply amount increasing unit 71 uniformly sorts the amount of fuel not injected by the performance of F/C into the plural cylinders other than the abnormal combustion occurring cylinder. In this situation, generally, since the inflow air volume to each cylinder is uniform, the fuel supply amount increasing unit 71 uniformly sorts the amount of fuel not injected into the respective cylinders.

In contrast thereto, the fuel supply amount increasing unit 71 is also capable of increasing the fuel supply amount to each cylinder in accordance with the air volume flowing into each cylinder. In this case, the larger the air volume flowing in each cylinder is, the more the fuel supply amount increasing unit 71 increases the increased amount of the fuel supply amount.

Moreover, when determining in step S1 that the abnormal combustion occurs, the fuel supply amount increasing unit 71 calculates the increased amount of the fuel supply amount at the time when confirming the cylinder where the F/C is to be performed and the fuel supply amount supposed to be supplied to that cylinder. For example, the fuel supply amount increasing unit 71 calculates the increased amount of the fuel supply amount at the time of performing the F/C.

Although the configuration according to the second embodiment has been explained above, the other configurations of the second embodiment are the same as those of the first embodiment.

(Advantageous Effects of Second Embodiment)

According to the second embodiment, the engine control device 60 increases the fuel supply amount to each cylinder other than the cylinder where the F/C is performed in such a way that the air-fuel ratio of the exhaust gas immediately before the catalyst 23 becomes the theoretical air-fuel ratio. Hence, according to the present embodiment, the engine control device 60 can cause the catalyst 23 disposed in the exhaust piping of the internal combustion engine 1 to efficiently purify the exhaust gas.

That is, if the F/C is performed on the abnormal combustion occurring cylinder, the air-fuel ratio of the exhaust gas of the whole cylinders including the cylinder where the F/C is not performed (including the cylinder which is an abnormal combustion occurring cylinder and on which F/C has not been performed yet) becomes lean (i.e., the air volume is larger than the theoretical air-fuel ratio), and thus NOx, etc., may become worse. In contrast thereto, according to the second embodiment, for example, the engine control device 60 increases the fuel supply amount to each cylinder other than the cylinder where the F/C is performed, so as to prevent the abnormal combustion from continuing without decreasing the purifying efficiency to HC, CO, and NOx, etc.

In addition, according to the second embodiment, the engine control device 60 increases the fuel supply amount to each cylinder other than the cylinder where the F/C is performed, i.e., the cylinder which is an abnormal combustion occurring cylinder and on which the F/C has not been performed yet, or the cylinder at which the abnormal combustion is not occurring. It is thereby possible to cool down beforehand the cylinder at which the abnormal combustion has already occurred or the cylinder at which the abnormal combustion has not occurred yet but which has a high possibility of an occurrence of the abnormal combustion.

Further, according to the second embodiment, the engine control device 60 increases the fuel supply amount to each cylinder in accordance with the air volume flowing into each cylinder other than the abnormal combustion occurring cylinder. Hence, according to the second embodiment, even if the air volume flowing into each cylinder varies among the cylinders, the engine control device 60 can set the fuel supply amount to each cylinder in accordance with such a fluctuation. As a result, according to the second embodiment, the engine control device 60 can suppress a generation of unburned HC, etc., due to an excessive increase in the fuel supply amount.

According to the second embodiment, the engine control device 60 calculates the increased amount of the fuel supply amount at the time of confirming the cylinder where the F/C is to be performed and the fuel supply amount supposed to be supplied to that cylinder upon determination that abnormal combustion occurs. Hence, according to the second embodiment, the engine control device 60 is capable of instantly and promptly outputting an instruction of increasing the fuel supply amount to another cylinder immediately after the F/C is carried out.

(Third Embodiment)

Next, an explanation will be given of a third embodiment with reference to the accompanying drawings. The same or similar configurations to those described in the first and second embodiments will be explained by denoting the same reference numerals.

According to the third embodiment, a process is carried out for positively increasing the fuel supply amount of an abnormal combustion occurring cylinder having the highest abnormal combustion intensity among plural abnormal combustion occurring cylinders.

Figure 6:
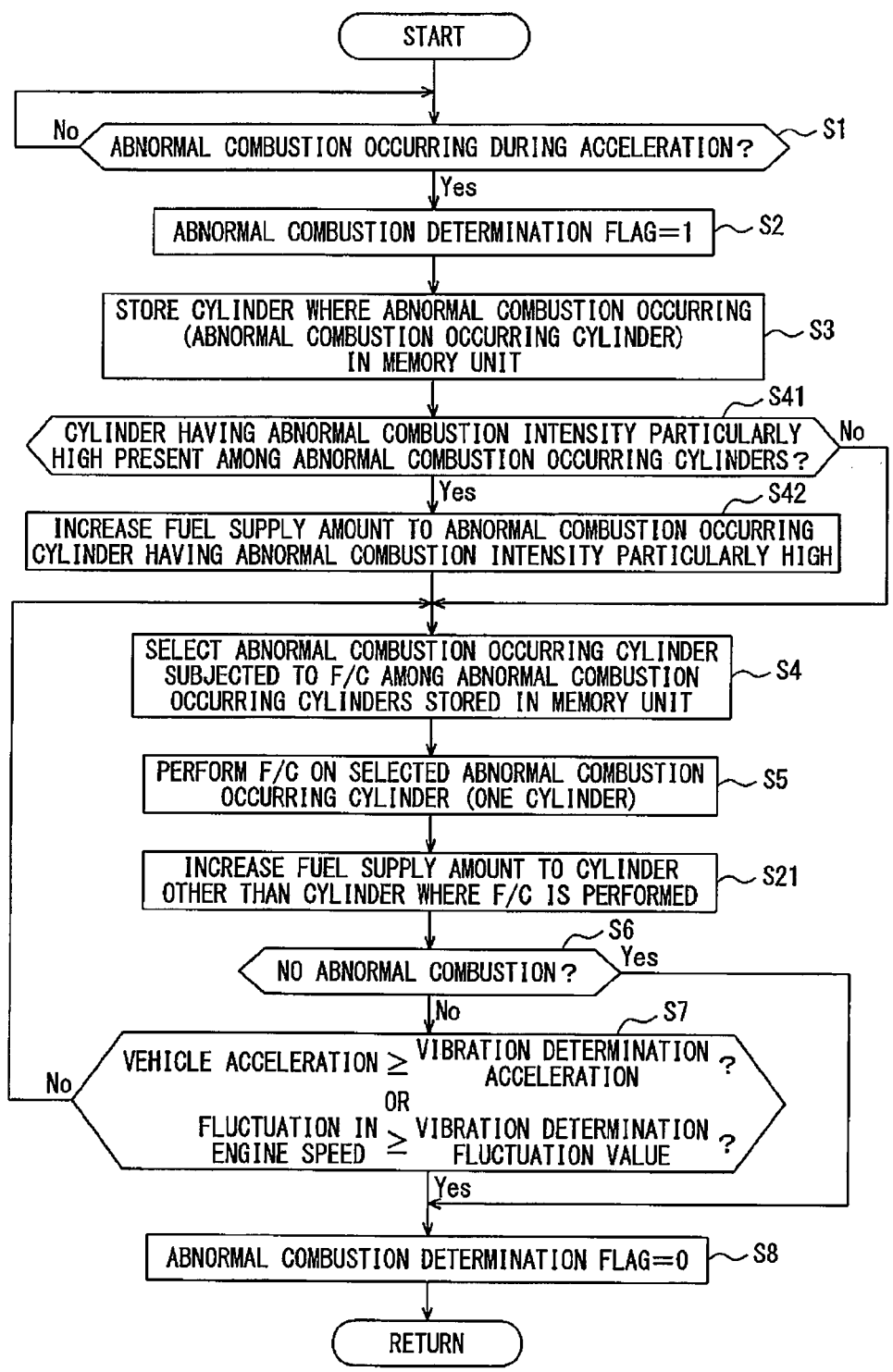
FIG. 6 is a flowchart illustrating an example of a process by an engine control device according to a third embodiment of the present invention.

FIG. 6 is a flowchart illustrating an example of a process of such a third embodiment.

As illustrated in FIG. 6, in this process, with respect to the process illustrated in FIG. 5 according to the second embodiment, processes of step S41 and step S42 are added after the process of step S3.

The engine control device 60 determines in step S41 whether or not there is an abnormal combustion occurring cylinder having an abnormal combustion intensity that is particularly high. When determining that there is an abnormal combustion occurring cylinder having a particularly high abnormal combustion intensity, the engine control device 60 progresses the process to step S42. Conversely, when determining that there is no abnormal combustion occurring cylinder having a particularly high abnormal combustion intensity, the engine control device 60 progresses the process to step S4.

Through the determination process in step S41, when there are plural abnormal combustion occurring cylinders, the engine control device 60 selects an abnormal combustion occurring cylinder having the highest abnormal combustion intensity among those abnormal combustion occurring cylinders.

The engine control device 60 increases in step S42 the fuel supply amount to the abnormal combustion occurring cylinder having the highest abnormal combustion intensity through the fuel supply amount increasing unit 71. At this time, the fuel supply amount increasing unit 71 increases the fuel supply amount in accordance with the abnormal combustion intensity. Specifically, the higher the abnormal combustion intensity is, the more the fuel supply amount increasing unit 71 increases the fuel supply amount. Next, the engine control device 60 progresses the process to step S4.

Although the configuration specific to the third embodiment has been explained above, the other configurations of the third embodiment are the same as those of the first and second embodiments.

According to the third embodiment, through the above-explained configuration, when detecting another abnormal combustion having a higher intensity in another cylinder, after detecting the abnormal combustion in any cylinder and until performing the F/C on that cylinder, the engine control device 60 preferentially increases the fuel supply amount to the abnormal combustion occurring cylinder having such a higher abnormal combustion intensity.

(Advantageous Effects of Third Embodiment)

According to the third embodiment, the engine control device 60 positively increases the fuel supply amount to the abnormal combustion occurring cylinder having the highest abnormal combustion intensity. Hence, according to the third embodiment, the engine control device 60 is capable of cooling down the interior of the abnormal combustion occurring cylinder at a higher efficiency than that for cooling down the interior of the cylinder realized without the combustion therein through carrying out of the F/C.

When the fuel supply amount to the cylinder having the highest abnormal combustion intensity is increased, the air-fuel ratio of the exhaust gas immediately before the catalyst 23 becomes lean in some cases only by the increase in the fuel supply amount to that cylinder. In contrast, according to the third embodiment, like the above-explained second embodiment, the engine control device 60 increases the fuel supply amount to each cylinder other than the cylinder where the F/C is performed in such a way that the air-fuel ratio of the exhaust gas immediately before the catalyst 23 becomes the theoretical air-fuel ratio (step S21).

Hence, according to the third embodiment, like the above-explained second embodiment, the engine control device 60 allows the catalyst 23 disposed in the exhaust piping of the internal combustion engine 1 to efficiently purify the exhaust gas.

According to the above explanation to the embodiments, the fuel supply amount increasing unit 71 has, for example, both functions as a fuel supply amount increasing unit and a fuel supply adjusting unit. Moreover, the engine control device 60 constitutes, for example, a combustion state control device for the internal combustion engine.

(Modifications to the Embodiments)

According to the present embodiment, the higher the water temperature detected by the water temperature sensor 53 is, the longer the engine control device 60 can set the time for continuing cutting off the fuel supply (i.e., a cut-off continuation time). In this case, in the present embodiment, the engine control device 60 increases the number of cycles for performing the F/C, thereby extending the time for continuing cutting off the fuel supply.

According to the present embodiment, the higher the intake temperature detected by the intake temperature sensor 55 is, the longer the engine control device 60 can set the time for continuing cutting off the fuel supply.

Moreover, according to the present embodiment, the higher the level of the abnormal combustion (i.e., the abnormal combustion intensity) is, the longer the engine control device 60 can set the time for continuing cutting off the fuel supply.

According to the present embodiment, the engine control device 60 employs the vehicle acceleration sensor 52 and the engine speed sensor 54 to detect a vibration of the vehicle caused by the vibration of the engine. The present embodiment is, however, not limited to such a configuration. That is, according to the present embodiment, the engine control device 60 can employ another detector to detect a vibration of the vehicle caused by the vibration of the engine.

According to the present embodiment, the engine control device 60 detects a vibration of the vehicle based on the detected value of the vehicle acceleration sensor 52 and that of the engine speed sensor 54. The present embodiment is, however, not limited to such a configuration. That is, according to the present embodiment, for example, the engine control device 60 can detect a vibration of the vehicle through a detected value of either the vehicle acceleration sensor 52 or the engine speed sensor 54. Such a configuration is advantageous when the vehicle is equipped with only one of the vehicle acceleration sensor 52 and the engine speed sensor 54.

According to the present embodiment, the engine control device 60 detects the abnormal combustion based on the detected value of each knocking sensor 56. The present embodiment is, however, not limited to such a configuration. That is, according to the present embodiment, for example, the engine control device 60 can detect the abnormal combustion based on a detected value of an ion current detecting unit that detects an ion current. The detection operation of the abnormal combustion through the ion current detecting unit will be described as follows.

The ion current detecting unit causes a current to flow through an electrode of a spark plug, and detects an ion current generated while a mixture gas is combusted. Next, the abnormal combustion detecting unit 62 detects the abnormal combustion that is a pre-ignition based on the generated timing of the ion current detected by the ion current detecting unit.

According to the present embodiment, the vehicle is capable of avoiding the abnormal combustion by delaying the closing timing of an intake valve by using a variable intake valve mechanism including the intake VVT actuator 31, i.e., by performing intake VVT retarding. In this case, according to the present embodiment, the engine control device 60 is capable of attempting to suppress the abnormal combustion through the F/C when it is difficult to avoid the abnormal combustion through such an intake VVT retarding.

The embodiments of the present invention have been explained in detail, but the scope and spirit of the present invention are not limited to the illustrated and described exemplified embodiments, and include all embodiments bringing the equivalent advantageous effect to the advantageous effect intended by the present invention. In addition, the scope and spirit of the present invention are not limited to any combination of the features set forth in appended claims, but can be defined by any desired combination of particular features among the disclosed features.

REFERENCE SIGNS LIST

1 Internal combustion engine
51 Vehicle speed sensor
52 Vehicle acceleration sensor
53 Water temperature sensor
54 Engine speed sensor
55 Intake temperature sensor
56 Knocking sensor
60 Engine control device
61 Acceleration determining unit
62 Abnormal combustion detecting unit
63 Fuel supply cut-off unit
64 Fuel supply cut-off ending unit
65 Vehicle vibration detecting unit
66 Memory unit
71 Fuel supply amount increasing unit

The invention claimed is:

1. A method of controlling an internal combustion engine, having a plurality of cylinders, on a vehicle, comprising:
   detecting abnormal combustion inside at least one cylinder of the plurality of cylinders;
   in response to detecting abnormal combustion inside the at least one cylinder, cutting off fuel supply to the at least one cylinder during a cycle from a current intake stroke to a next intake stroke;
   detecting vibration of the vehicle by a vibration detecting unit; and
   ending cutting off fuel supply to the cylinder in response to the vibration detecting unit detecting vibration, and wherein the vibration detection unit detects vibration of the vehicle in response to a determination that a vehicle acceleration is equal to or larger than a vibration determination vehicle acceleration or that a fluctuation in engine speed is equal to or larger than a vibration determination fluctuation value during cutting off fuel supply to the cylinder;
   wherein, in response to detecting abnormal combustion inside two or more of the plurality of cylinders, fuel supply to the two or more of the plurality of cylinders is cut off one after another;
   the method further comprising:
   increasing an amount of fuel supplied to at least one of the two or more of the plurality of cylinders when detecting abnormal combustion inside the two or more cylinders of the plurality of cylinders so that the amount of fuel supplied is greater than when detecting no abnormal combustion inside the two or more cylinders of the plurality of cylinders;
   detecting a degree of abnormal combustion inside each of the two or more of the plurality of cylinders;
   selecting one of the two or more of the plurality of cylinders which experiences the highest degree of abnormal combustion among the two or more of the plurality of cylinders;
   increasing the amount of fuel supplied to the selected one cylinder so that the amount of fuel supplied is higher than when detecting no abnormal combustion inside the selected one cylinder; and
   cutting off fuel supply to at least one other cylinder of the two or more of the plurality of cylinders other than the selected one cylinder.

2. The method according to claim 1, further comprising:
   adjusting fuel supply to remaining cylinders of the plurality of cylinders, other than the at least one other cylinder for which fuel supply is cut off, to cause exhaust gas from the plurality of cylinders to approach a stoichiometric air-fuel ratio.

3. The method according to claim 1, further including setting a period of time for cut off such that the higher the degree of abnormal combustion, the longer the period of time, during which fuel supply to the cylinder is cut off, becomes.

* * * * *